Dec. 22, 1953    J. VERDERBER    2,663,151
FLUID-OPERATED CLAMPING DEVICE WITH MECHANICAL
ADVANTAGE AND DELAYED RELEASE ACTION
Filed Sept. 9, 1952    4 Sheets-Sheet 1

*INVENTOR.*
JOSEPH VERDERBER
BY
ATTORNEYS

Dec. 22, 1953          J. VERDERBER          2,663,151
FLUID-OPERATED CLAMPING DEVICE WITH MECHANICAL
ADVANTAGE AND DELAYED RELEASE ACTION
Filed Sept. 9, 1952          4 Sheets-Sheet 2
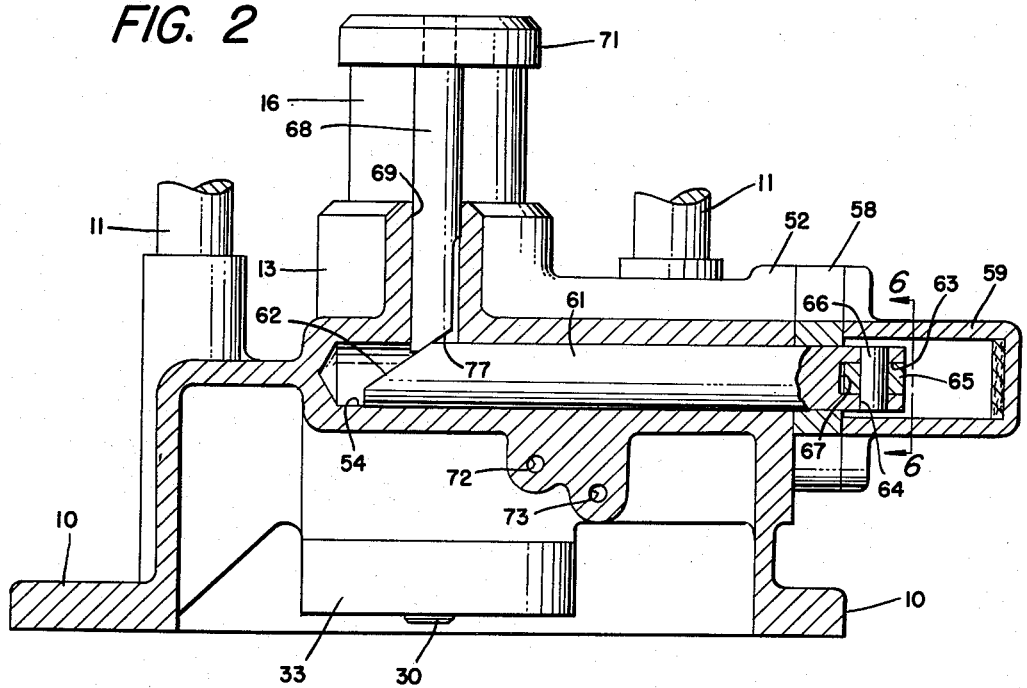
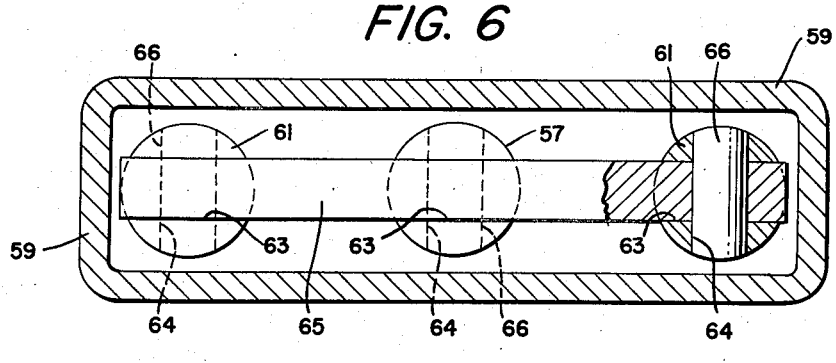
*INVENTOR.*
JOSEPH VERDERBER
BY
ATTORNEYS Dec. 22, 1953  J. VERDERBER  2,663,151
FLUID-OPERATED CLAMPING DEVICE WITH MECHANICAL
ADVANTAGE AND DELAYED RELEASE ACTION
Filed Sept. 9, 1952  4 Sheets-Sheet 3
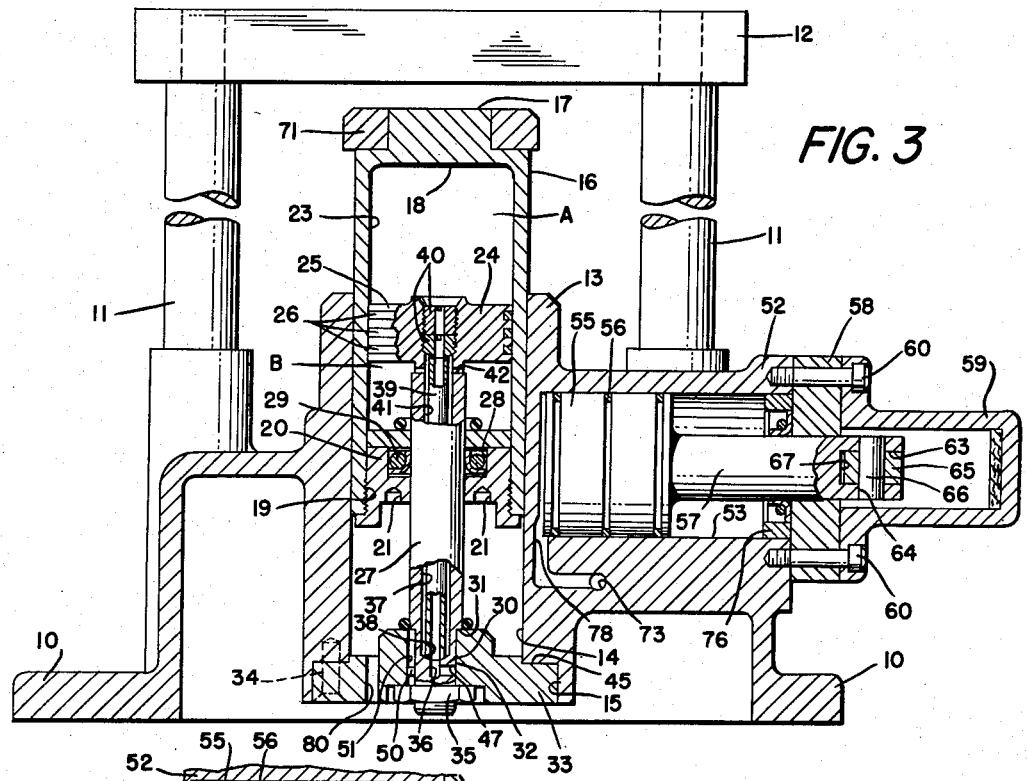
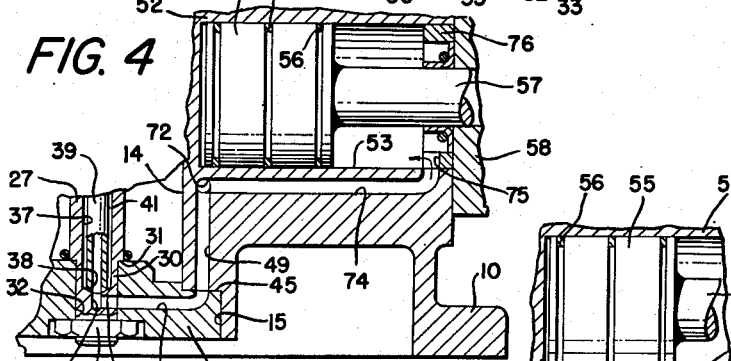
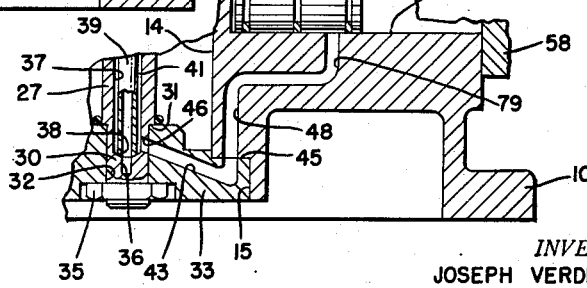
INVENTOR.
JOSEPH VERDERBER
BY
ATTORNEYS Dec. 22, 1953   J. VERDERBER   2,663,151
FLUID-OPERATED CLAMPING DEVICE WITH MECHANICAL
ADVANTAGE AND DELAYED RELEASE ACTION
Filed Sept. 9, 1952   4 Sheets-Sheet 4

INVENTOR.
JOSEPH VERDERBER
BY
*John and Ornstein*
ATTORNEYS

UNITED STATES PATENT OFFICE 2,663,151

FLUID-OPERATED CLAMPING DEVICE WITH MECHANICAL ADVANTAGE AND DELAYED RELEASE ACTION

Joseph Verderber, Cleveland, Ohio

Application September 9, 1952, Serial No. 308,580

7 Claims. (Cl. 60—97)

The present application relates generally to clamping devices or jigs for holding work pieces in position during manufacturing operations. More particularly, this disclosure relates to a fluid-actuated clamping device in which auxiliary mechanical camming and locking means are provided to supplement the fluid-actuated clamping action.

In my copending patent application Serial No. 284,667 filed April 26, 1952, and entitled "Pneumatic Clamping Device With Mechanical Advantage" I have disclosed a device in which compressed air is utilized to advance and retract a clamping bar or clamping piston, and the compressed air is likewise utilized to move piston-actuated camming rods or wedges into and out of camming engagement with elements of the clamping bar.

In my copending patent application Serial No. 302,331 filed August 2, 1952, and entitled "Fluid-Operated Clamping Device With Mechanical Advantage" I have disclosed a device in which compressed fluid is utilized to elevate a clamping bar which has positive enter-engagement with piston-actuated camming rods or wedges which are controlled by compressed air. The retraction of the wedges induces the retraction of the clamping bar, mechanically.

In both of the foregoing disclosures, each of the camming wedges was integrated with an independent piston, and in the operation of the device the fluid pressures were exerted simultaneously on the wedges and the clamping bar so that retraction of the device was accomplished by a concurrent withdrawal of the clamping bar and the wedges.

It is the primary object of my invention to provide a clamping device of the character described in which a single piston is utilized to motivate a plurality of camming wedges, thereby effecting substantial economies in manufacture as well as improved performance.

Another object of my invention is to provide a clamping device of the character described in which the member connecting the piston to the camming wedges is so constructed and arranged that it will yield to slight inequalities in the contemporary movement of the wedges.

A further object of my invention is to provide a clamping device of the character described in which a progressive retraction of the mechanical means and the pneumatic means is caused to occur in predetermined sequence.

Other objects and advantages of the invention will be apparent during the course of the following description.

In the accompanying drawings, forming a part of the specification, and in which like numerals are employed to designate like parts throughout the same, Fig. 1 is a top plan view of a clamping device embodying the features of my invention.

Fig. 2 is a cross-sectional view of the device taken on line 2—2 of Fig. 1 and showing details of the camming wedges.

Fig. 3 is a cross-sectional view taken on line 3—3 of Fig. 1 and showing details of the clamping bar piston and the wedge-actuating piston.

Fig. 4 is a fragmentary cross-sectional view taken on line 4—4 of Fig. 1 and disclosing certain of the fluid passage-ways.

Fig. 5 is a fragmentary cross-sectional view taken on line 5—5 of Fig. 1 and showing another fluid passageway.

Fig. 6 is a cross-sectional view taken on line 6—6 of Fig. 2, a portion thereof being broken away to show the securement of the connecting bar.

Figure 1:
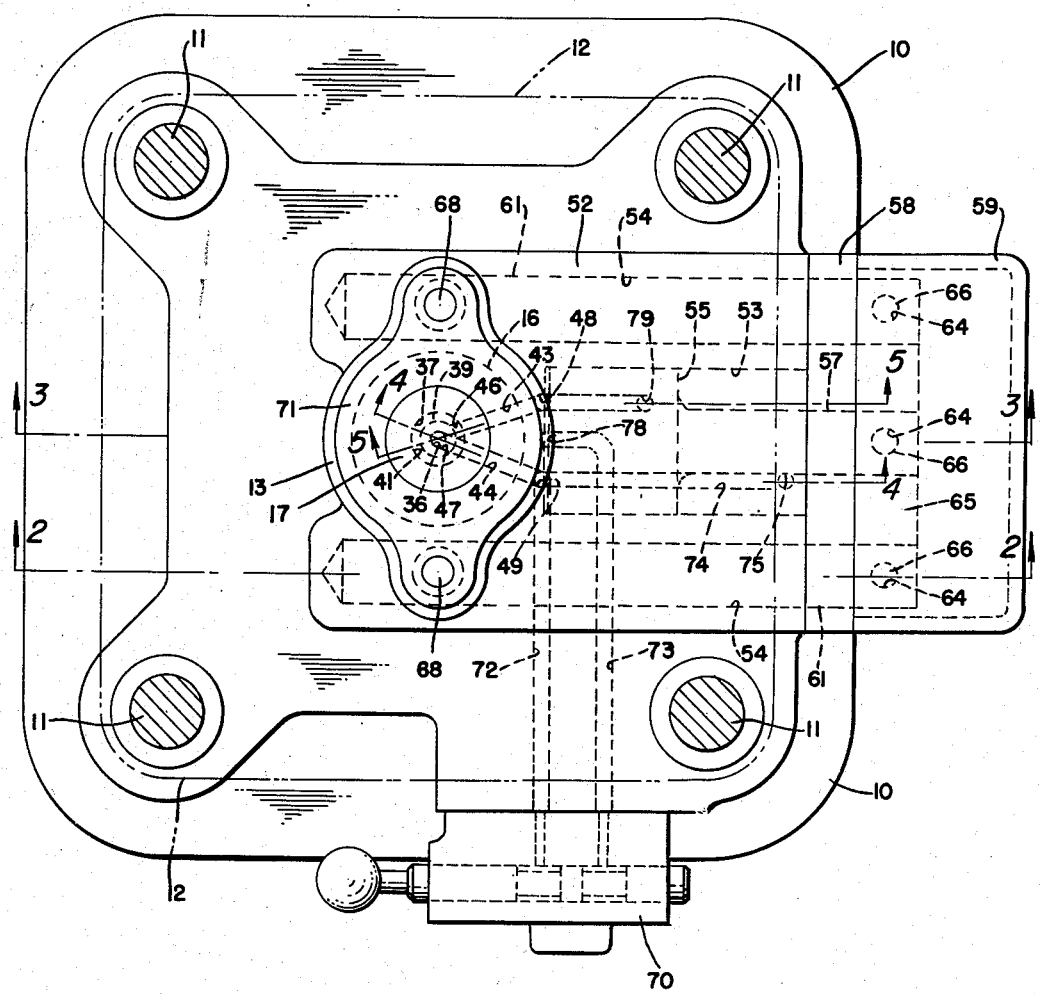

Referring more particularly to Figs. 1 to 6, inclusive, of the drawings, the clamping device or jig comprises a base 10, which may be a casting, and which is of generally rectangular form. Mounted in the four corners of the base are upstanding posts 11 to which is secured a top-plate 12 against which the work-piece is clamped by the mechanism to be described.

Projecting vertically upwardly from the base 10 is a cylindrical embossment 13 having a longitudinal bore 14 extending completely therethrough. The bore 14 is counterbored as at 15 for a purpose to be described.

Slidably mounted in the bore 14 of the embossment 13 is a hollow cylindrical clamping bar 16 having an upper closed end 17 which forms an interior face or surface 18.

The lower open end of the clamping bar 16 is threaded interiorly thereof as at 19 and has threadedly secured thereto a plug 20 having spaced spanner openings 21 provided therein for ease of assembly. The plug 20 thus seals the open end of the clamping bar 16 to define a cavity or air chamber 23 as will appear more fully hereinafter.

Disposed within the cavity 23 is a stationary divider 24 which is substantially in the form of a piston head 25 having axially spaced piston rings 26 mounted thereon which, having a wiping engagement with the wall of the cavity, serve to prevent the escape of air. The piston 25 has an integral rod or stem 27 which depends therefrom and extends through the plug 26. The plug 26 has an annular recess 28 therein, in which is secured an oil seal 29 which embraces the stem 27.

The stem 27 terminates in an extension 30 of reduced diameter thereby forming a circumferential shoulder 31. The portion 30 of the stem extends through a bore 32 of a cap 33 which is mounted in the counterbore 15 and secured to the base 10 by means of screws 34. A nut 35 is threadedly secured to the portion 30 of the stem and serves to maintain the shoulder 31 in abutment with the cap 33.

The divider 24 has an axial closed-end bore 36 which starts a short distance above the end of the extension 30. The bore 36 is counterbored as at 37, which counterbore extends through piston head 25 and stem 27 to a point a short distance above the end of bore 36, thereby forming a shoulder 38. A tube 39, having an internal diameter equal to that of bore 36 and having an external diameter of less than that of bore 37, is axially disposed within the bore 37 and secured against the shoulder 38 by means of two hollow set screws 40 which are threadedly secured in the bore 37 and engage and center the uper end of tube 39. The upper screw 40 serves as a locking screw and both screws act as extensions of the bore 36.

The bore of the tube 39 thus provides an extension of the bore 36 of the stem 27, which bore communicates with the upper portion A of the air chamber 23. The tube 39 also defines an annular passageway 41 in the stem 27, which passageway communicates with the lower portion B of the chamber through a diametrical opening 42 which is provided in the stem 27.

The cap 33, which fits snugly on the extension 30 of the stem, has two channels 43 and 44 formed therein. The channel 43 extends downward from an annular face 45 of the cap 33 and then extends angularly upwardly to the bore 32 of the cap where it communicates with a radial opening 46 in the extension 30 which leads to the passageway 41 in bore 37. The channel 44 is spaced circumferentially from the channel 43 and runs downwardly from the face 45 and then radially to the bore 32 where it communicates with a radial opening 47 which leads to the bore 36.

The base 10 is provided with openings 48 and 49 defining vertical channels which are in registry with the passageways 43 and 44, respectively. Angular alignment of channels 43 and 44 with the radial openings 46 and 47, respectively, is effected by means of a radial key 50 on extension 30 which engages a keyway 51 in the cap 33.

The above described arrangement of parts is fully disclosed and claimed in my copending application Serial No. 162,557 filed May 17, 1950, entitled "Fluid-Operated Clamping Device with Lubricant Atomizing Means."

The base 10 is provided with an embossment in the form of cylinder block 52 having a central horizontally extending bore 53 and to either side thereof smaller bores 54.

The bore 53 defines a cylinder in which is mounted a piston 55 having sealing rings 56 which have wiping engagement with the wall of the cylinder. The piston has an integral rod or stem 57 which projects through a cylinder head 58 and into a hollow dust cover 59. The head 58 and the cover 59 are secured to the cylinder block 52 by means of screws 60.

Each of the bores 54 acts as a guideway in which is slidably received a camming element in the form of a rod 61 having a plane inclined surface 62 at one end thereof. Each of the rods 61 and the piston rod 57 is provided with an axially extending recess 63 which lies in a plane normal to a radial aperture 64 which traverses the recess. A tie bar or rocker bar 65, which is of a width slightly less then the depth of the recess 63, is adapted to be received in the recesses and is pivotally secured to the rods 57 and 61 by means of a pin 66 which is pressed into the apertures 64 so as to traverse the bar 65 through apertures provided therein. It will be noted that this arrangement of the parts has the effect of causing the rods 61 to move in response to movement of piston rod 57 as transmitted through the rocker bar 65. It will also be noted that a clearance space 67 is provided between the bar 65 and the bottom of each recess 63. This space permits the bar 65 to have a limited pivotal movement with respect to the axis of each of the pins 66 and thus provides a flexible structure which can yield to slight inequalities of movement of the rods 57 and 61.

Each of the camming rods 61 is adapted to engage a guide rod 68 which is slidably mounted in a vertically extending bore 69 in the embossment 13. The guide rods 68 are secured at their upper ends to a clamping block 71 which is fixedly secured to the clamping bar 16 for movement therewith.

The means for actuating the clamping device consists of fluid under pressure, such as compressed air, the flow of which is controlled by a three-position valve 70 of the type disclosed in my aforesaid copending application Serial No. 162,557. The valve is mounted on the base 10 and is in registry with each of two horizontally extending channels 72 and 73 which are provided in the base 10.

As best seen in Figs. 1 and 4, the channel 72 communicates with another channel 74 which, through a recess or port 75 in a cylinder cap 76, communicates with the right end of the cylinder 53. The channel 72 also intersects and communicates with the previously described channel 49 in base 10 and thereby the channel 44 in cap 33.

It will be apparent that when valve 70 is manipulated to direct compressed air into channel 72, a portion of such air will flow through the interior of tube 39 and into the portion A of the chamber 23 thereby causing the clamping bar 16 to be elevated. Simultaneously, another portion of the air will flow through channel 74 into cylinder 53 and cause piston rod 57 to be displaced to the left, as viewed in Fig. 3. This movement of the piston causes the camming rods 61 to engage an inclined surface 77 which is provided on the guide rods 68, and cam these guide rods and the clamping block 71 into locking engagement with the work-piece which is to be clamped against the top-plate 12.

The channel 73 communicates with a port 78 in the end of the cylinder 53, as shown in Fig. 3. When the valve 70 is manipulated to direct the air flow into channel 73, the air acts upon the piston 55 to move it to the right as viewed in Fig. 5, thus causing the camming rods 61 to retract and become disengaged from the guide rods 68. However, inasmuch as there is no air flow into the clamping bar chamber B, there will be no positive retraction of the clamping bar 16. As the piston 55 moves to the right in cylinder 53, it exposes a previously closed cylinder port 79 which communicates with the channel 48. A portion of the air thus escapes from cylinder 53 and travels through channel 43 in cap 33 into the annular passageway 41 in the stem 27. The air then is directed through radial opening 42 into the portion B of the cavity 23 and thus causes clamping bar 16 to be retracted.

During the downward movement of the clamping bar, the entrapped air in the chamber A is exhausted through the valve 70. The entrapped air between plug 20 and cap 33 is vented through an opening 80 which is provided in cap 33.

From the foregoing description it will be apparent that I have provided a clamping device in which I obtain the equalized mechanical locking action of two camming rods through the utilization of only a single actuating piston, thereby effecting substantial economies in manufacture over the form of clamping device in which each camming rod is actuated by a separate fluid motor.

It will also be noted that this form of clamping device is so arranged that the mechanical locking means is retracted before the air is permitted to effect retraction of the clamping bar. This feature of the invention lends versatility to the operation of the clamping device and reduces the wear on the camming surfaces. By suitable manipulation of the valve 70, this sequential operation can be controlled to permit the workpiece to be adjusted in the device without completely releasing it from clamped position. For example, when the work-piece has been clamped and locked in position in the device it may be found necessary to make a slight adjustment in its position. By opening the valve 70 to cause retraction of the camming rods and then closing the valve before the piston 55 has moved back far enough to expose port 79, the clamping bar is thereby unlocked but not retracted. Its clamping pressure is reduced sufficiently however, to permit the position of the work-piece to be adjusted. After the necessary adjustment has been effected, the work-piece is still clamped by the bar 16 and the valve 70 can be moved to cause the camming rods to advance thereby again locking the clamping bar against downward movement.

If there should be more wear on one pair of camming surface 62—77 than on the other pair, the rocker bar 65 will pivot to a limited extent to equalize the forward movement of the rods 61 so that they both engage the guide rods 68 simultaneously. Thus the rocker bar automatically compensates for unequal wear on the camming surfaces.

Figure 7:
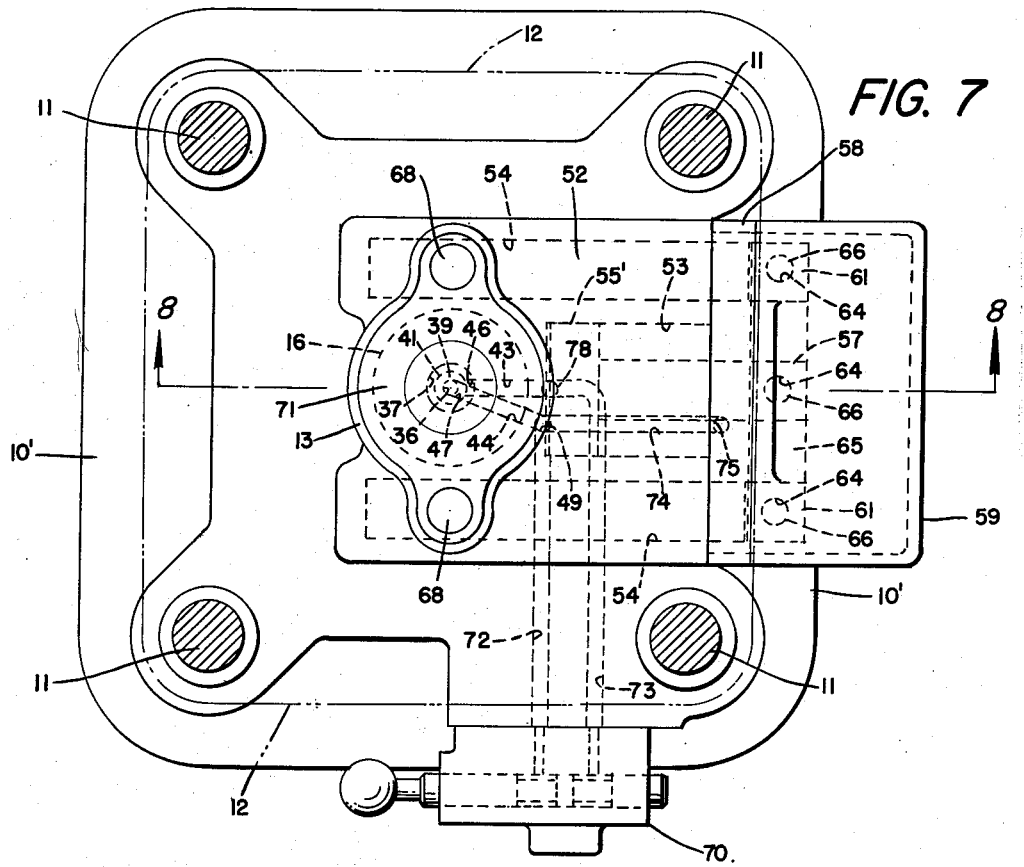
Fig. 7 is a top plan view of a modified form of the invention.
Figure 8:
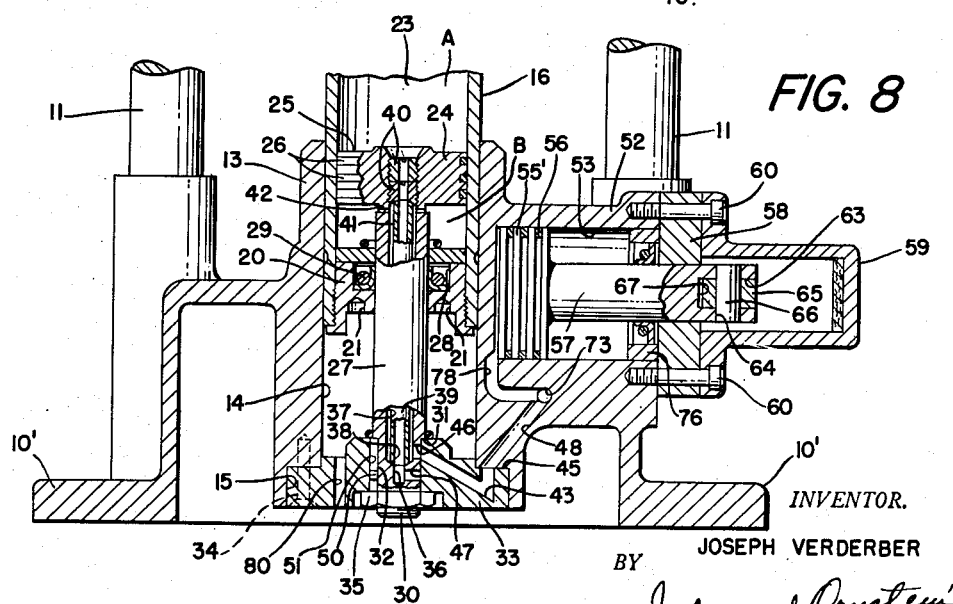
Fig. 8 is a cross-sectional view taken on line 8—8 of Fig. 7.

Referring now to the form of the invention shown in Figs. 7 and 8, I have shown a clamping device which embodies substantially all the features of the device shown in Figs. 1–6 but which is so arranged that there will be no delayed retraction of the clamping bar.

The base 10' of the modified form of device has the same channel arrangement for advancing and locking the clamping bar 16 as the form shown in Figs. 1–6. However, for purposes of retracting the camming rods 61 and the clamping bar 16, the channel 73 communicates directly with the channel 48 as well as with the cylinder port 78. The port 79 is eliminated in this form of the invention. Therefore when air flows into channel 73 it acts upon the clamping bar 16 and the piston 55 simultaneously, causing concurrent retraction of these elements.

It is to be understood that the forms of my invention, herewith shown and described, are to be taken as preferred examples of the same, and that various changes in the shape, size and arrangement of parts may be resorted to, without departing from the spirit of my invention or the scope of the subjoined claims.

Having thus described my invention, I claim:

1. In a clamping device actuated by fluid pressure, the combination of a cylinder, a piston slidably mounted in said cylinder, a plurality of slidably mounted camming rods disposed in radially spaced relationship to said piston, means extending transversely of said piston for securing said camming rods to said piston for concurrent colinear movement therewith, a clamping bar, and a cam follower on said clamping bar engageable by said camming rods to elevate said clamping bar in response to actuation of said piston.

2. In a clamping device actuated by fluid pressure, the combination of a cylinder, a piston slidably mounted in said cylinder, a plurality of slidably mounted camming rods disposed in radially spaced relationship to said piston, a unitary tie bar pivotally secured to said piston and said camming rods transversely thereof to effect concurrent colinear movement of said rods and said piston, a clamping bar, and a cam follower on said clamping bar engageable by said camming rods to elevate said clamping bar in response to actuation of said piston, said tie bar being pivotally movable in response to unequal engagement of said camming rods with said cam follower.

3. In a clamping device actuated by fluid pressure, the combination of a cylinder, a piston slidably mounted in said cylinder for movement in a horizontal datum plane, a plurality of slidably mounted camming rods disposed in radially spaced relationship to said piston, means for securing said camming rods to said piston for concurrent colinear movement therewith, a clamping bar mounted for movement in a vertical plane, control means for selectively directing fluid under pressure against said piston and against said clamping bar to elevate said bar toward clamping position, and a cam follower on said clamping bar engageable by said camming rods in response to actuation of said piston to mechanically further elevate and maintain said clamping bar in clamping position.

4. In a clamping device actuated by fluid pressure, the combination of a cylinder, a piston slidably mounted in said cylinder for movement in a horizontal datum plane, a plurality of slidably mounted camming rods, a unitary tie bar pivotally secured to said piston and said camming rods to effect concurrent movement of said rods and said piston, a clamping bar mounted for movement in a vertical plane, control means for selectively directing fluid under pressure against said piston and against said clamping bar to elevate said clamping bar to clamping position, and a cam follower on said clamping bar engageable by said camming rods in response to actuation of said piston to mechanically secure said clamping bar in clamping position, said tie bar being pivotally movable in response to unequal engagement of said rods with said cam follower.

5. In a clamping device actuated by fluid pressure, the combination of a cylinder, a clamping bar slidably mounted in said cylinder for pressure-responsive reciprocable movement therein, a pressure-actuated camming rod movable into elevating engagement with said clamping bar when said clamping bar is near clamping position, means for directing fluid under pressure against said camming rod to retract the same, and means responsive to continued retraction of said camming rod for directing fluid under pressure against said clamping bar to retract the same.

6. In a clamping device actuated by fluid pressure, the combination of a cylinder, a clamping bar slidably mounted in said cylinder for pressure-responsive reciprocable movement therein, a second cylinder, a piston slidably mounted in said second cylinder, camming rods secured to said piston in radially spaced relationship thereto and colinearly movable therewith, control means for selectively directing fluid under pressure into said cylinders to elevate said clamping bar toward clamping position and to advance said rods into elevating engagement with said clamping bar, and means responsive solely to prior retraction of said piston for directing fluid under pressure against said clamping bar to retract the same.

7. A combination as defined in claim 6, including a unitary tie bar linking said camming rods and said piston, said tie bar being pivotally movable in response to unequal engagement of said rods with said clamping bar.

JOSEPH VERDERBER.

References Cited in the file of this patent
UNITED STATES PATENTS

| Number | Name | Date |
| --- | --- | --- |
| 2,130,618 | Gnavi | Sept. 20, 1938 |
| 2,260,662 | Farrell | Oct. 28, 1941 |
| 2,443,775 | Olson | June 22, 1948 |